United States Patent
Li et al.

(10) Patent No.: US 11,218,232 B1
(45) Date of Patent: Jan. 4, 2022

(54) DC OFFSET CALIBRATION SYSTEM AND METHOD

(71) Applicant: Sigmastar Technology Ltd., Xiamen (CN)

(72) Inventors: Jian Li, Xiamen (CN); Kai Sun, Xiamen (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 0 days.

(21) Appl. No.: 17/207,779

(22) Filed: Mar. 22, 2021

(30) Foreign Application Priority Data

Jul. 31, 2020 (CN) .......................... 202010760095.2

(51) Int. Cl.
*H04B 17/00* (2015.01)
*H04B 17/21* (2015.01)
*H04B 1/16* (2006.01)

(52) U.S. Cl.
CPC ........... *H04B 17/21* (2015.01); *H04B 1/1615* (2013.01)

(58) Field of Classification Search
CPC ......... H04W 24/08; H04B 17/21; H04B 1/40; H04B 10/2941; H04B 10/40; H04B 10/60; H04B 10/6933; H04B 17/14; H04B 17/318; H04B 1/04; H04B 3/04; H04B 7/0417
See application file for complete search history.

(56) References Cited

U.S. PATENT DOCUMENTS

| | | | | |
|---|---|---|---|---|
| 7,646,802 B2* | 1/2010 | Black | ................... | H04B 1/7115 375/147 |
| 8,204,154 B2* | 6/2012 | Min | ........................ | H04B 1/30 375/319 |
| 8,594,603 B2* | 11/2013 | Balankutty | .............. | H04B 1/12 455/296 |
| 9,231,634 B2* | 1/2016 | Onishi | ................... | H04B 1/123 |
| 11,070,196 B2* | 7/2021 | Testi | ........................ | H03F 1/56 |

* cited by examiner

*Primary Examiner* — Nhan T Le
(74) *Attorney, Agent, or Firm* — WPAT, PC

(57) ABSTRACT

A DC offset calibration system and method. The method includes: in a first calibration mode, outputting a first digital signal by using a control circuit, generating a first differential calibration signal according to the first digital signal by using a first digital-to-analog conversion circuit, generating a first amplified signal according to the first differential calibration signal by using an amplification circuit, and feeding back the first amplified signal to the control circuit to adjust the first digital signal; and in a second calibration mode, outputting a second digital signal by using the control circuit, generating a second differential calibration signal according to the second digital signal by using a second digital-to-analog conversion circuit, generating a second amplified signal according to the second digital signal by using an equalizing circuit and the amplification circuit, and feeding back the second amplified signal to the control circuit to adjust the second digital signal.

16 Claims, 11 Drawing Sheets

DC OFFSET CALIBRATION SYSTEM AND METHOD

CROSS-REFERENCE TO RELATED APPLICATION

This non-provisional application claims priority under 35 U.S.C. § 119(a) to Patent Application No. 202010760095.2 filed in China, P.R.C. on Jul. 31, 2020, the entire contents of which are hereby incorporated by reference.

BACKGROUND

Technical Field

The present invention relates to the field of DC offset calibration, and in particular, to a DC offset calibration system and method.

Related Art

With the continuous improvement of the integrated circuit manufacturing process, high-speed serial communication technologies have been further developed. However, with an increase of a clock speed and various undesirable factors during transmission (for example, transmission line loss and manufacturing process deviation), the transmission performance of a high-speed receiver circuit will be degraded, and even the requirement of a high-speed data transmission protocol cannot be satisfied. In view of the above situation, it is necessary to add a terminal matching circuit, an equalizing circuit, and a sense amplifier to the high-speed receiver circuit to alleviate the problem, but adding these circuits also introduces a process deviation and a DC offset error, so it is very important to eliminate these errors. At present, the technologies to eliminate the DC offset are to reduce the offset error by directly increasing an element area, and to calibrate the offset error by adding an auxiliary analog circuit. The method of reducing the offset error by directly increasing the element area is simple, but may affect an operating speed of the high-speed receiver circuit. The method of adding the auxiliary analog circuit is filtering out, by using a low-pass filter, high-frequency components of a signal to obtain a DC potential to control and eliminate the DC offset. However, the disadvantage is that the low-pass filter circuit also needs to occupy the element area, which will also affect the operating speed of the high-speed receiver circuit.

SUMMARY

In view of the above, the present invention proposes a DC offset calibration system and method.

In some embodiments, the DC offset calibration system is disposed at a receiver to process a differential input signal, and is adapted to operate in one of an operation mode, a first calibration mode, and a second calibration mode. The DC offset calibration system includes a matching circuit, an equalizing circuit, an amplification circuit, a control circuit, a first digital-to-analog conversion circuit, and a second digital-to-analog conversion circuit. The equalizing circuit is electrically connected to the matching circuit, the amplification circuit is electrically connected to the equalizing circuit, and the control circuit is electrically connected to the amplification circuit. In the operation mode, the matching circuit provides impedance matching for the differential input signal. The control circuit outputs a first digital signal in the first calibration mode, and outputs a second digital signal in the second calibration mode. The first digital-to-analog conversion circuit generates a first differential calibration signal according to the first digital signal, and the second digital-to-analog conversion circuit generates a second differential calibration signal according to the second digital signal. In the first calibration mode, the amplification circuit generates a first amplified signal according to the first differential calibration signal, and feeds back the first amplified signal to the control circuit to adjust the first digital signal, thereby reducing DC offset of the amplification circuit. In the second calibration mode, the equalizing circuit and the amplification circuit generate a second amplified signal according to the second digital signal, and feed back the second amplified signal to the control circuit to adjust the second digital signal, thereby reducing DC offset of the equalizing circuit.

In some embodiments, the DC offset calibration method is adapted to operate in one of an operation mode, a first calibration mode, and a second calibration mode. The DC offset calibration method includes: providing, in the operation mode by a matching circuit, impedance matching for a differential input signal; in first calibration mode: outputting, by a control circuit, a first digital signal; generating, by a first digital-to-analog conversion circuit, a first differential calibration signal according to the first digital signal; and generating, by an amplification circuit, a first amplified signal according to the first differential calibration signal, and feeding back the first amplified signal to the control circuit to adjust the first digital signal, thereby reducing DC offset of the amplification circuit; and in the second calibration mode: outputting, by the control circuit, a second digital signal; generating, by a second digital-to-analog conversion circuit, a second differential calibration signal according to the second digital signal; and generating, by the equalizing circuit and the amplification circuit, a second amplified signal according to the second digital signal, and feeding back the second amplified signal to the control circuit to adjust the second digital signal, thereby reducing DC offset of the equalizing circuit.

Based on the above, according to the DC offset calibration system and method provided by some embodiments of the present invention, the control circuit, the first digital-to-analog conversion circuit, and the second digital-to-analog conversion circuit can be used to calibrate the DC offset during processing of the differential input signal by the matching circuit, the equalizing circuit, and the amplification circuit. In the first calibration mode, the control circuit adjusts the first digital signal according to the amplified signal fed back by the amplification circuit, and the first digital-to-analog conversion circuit outputs the first differential calibration signal to the amplification circuit according to the first digital signal, to adjust the DC offset. In the second calibration mode, the control circuit adjusts the second digital signal according to the amplified signal fed back by the amplification circuit, and the second digital-to-analog conversion circuit outputs the second differential calibration signal to the equalizing circuit according to the second digital signal, to adjust the DC offset. In the operation mode, the matching circuit can provide impedance matching for the differential input signal. Therefore, the DC offset calibration system can eliminate the DC offset.

DETAILED DESCRIPTION

Figure 1:
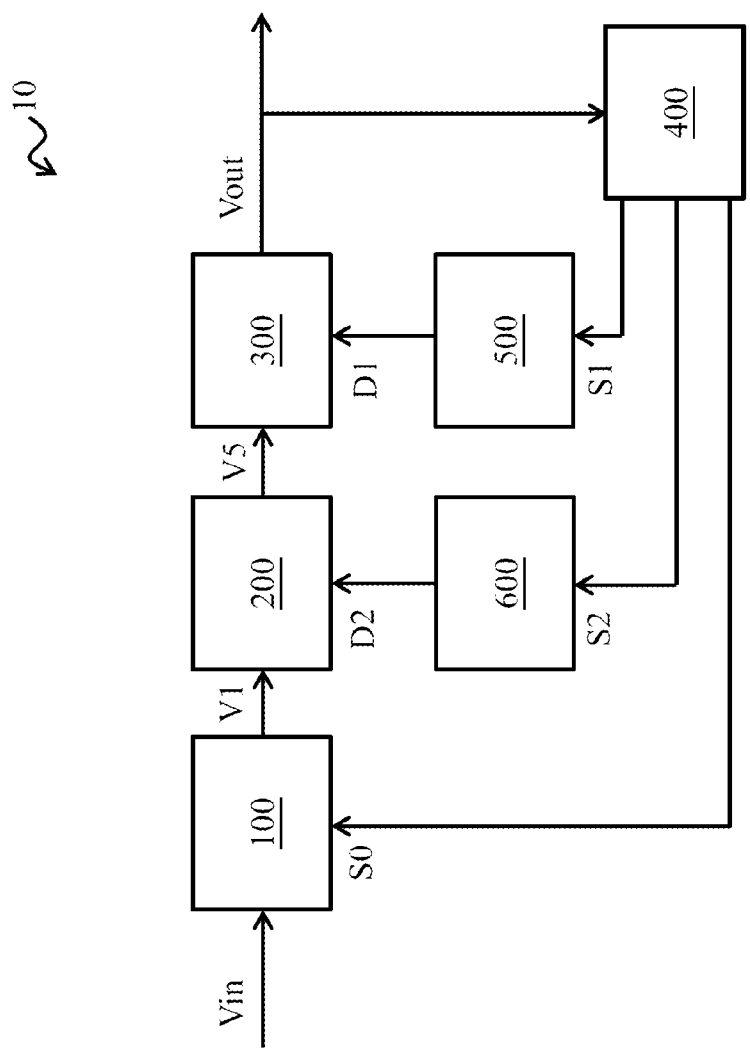
FIG. 1 is a schematic block diagram of a DC offset calibration system according to some embodiments of the present invention.
Figure 2:
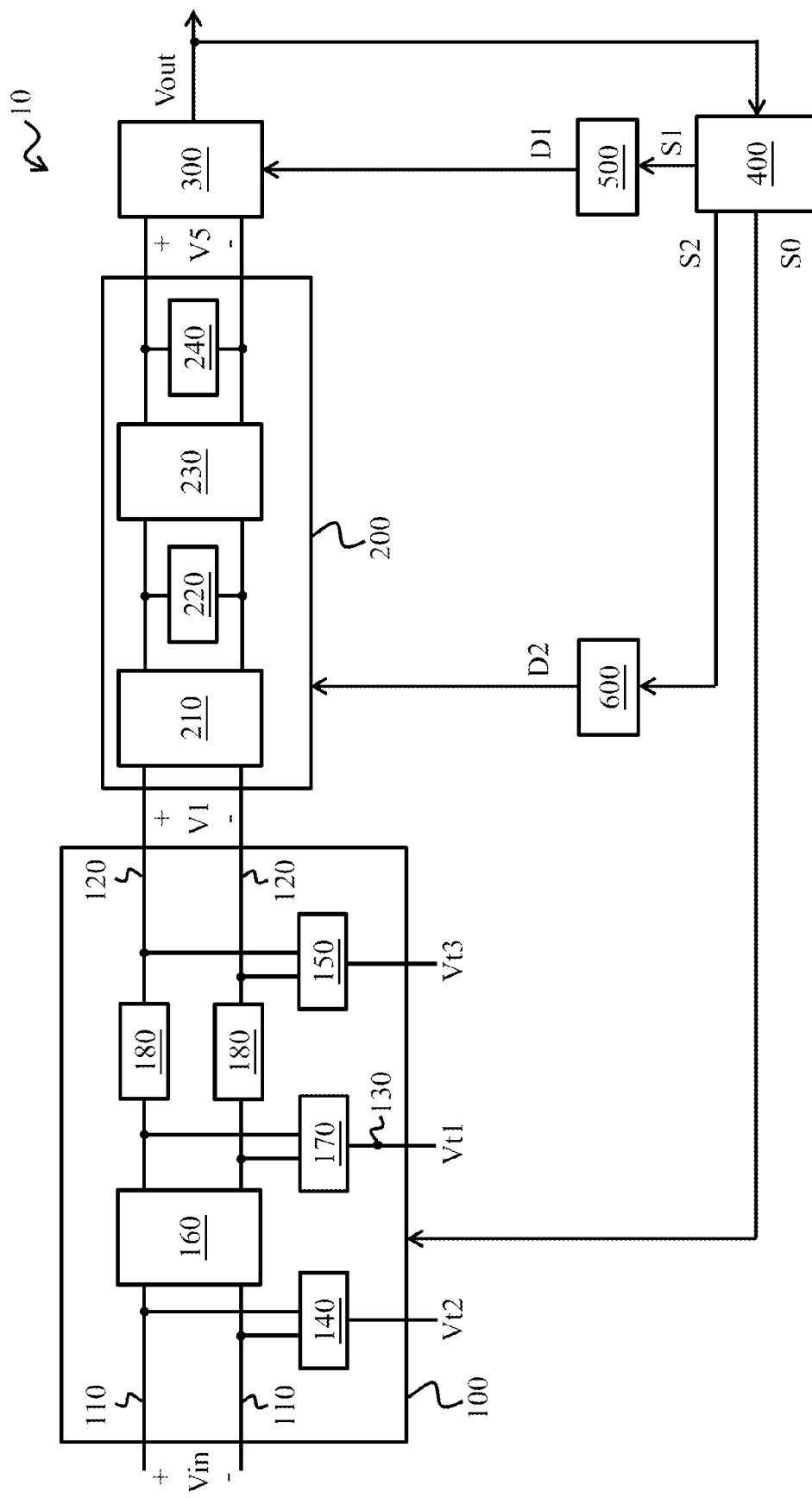
FIG. 2 is a schematic circuit diagram of a DC offset calibration system according to some embodiments of the present invention.
Figure 3:
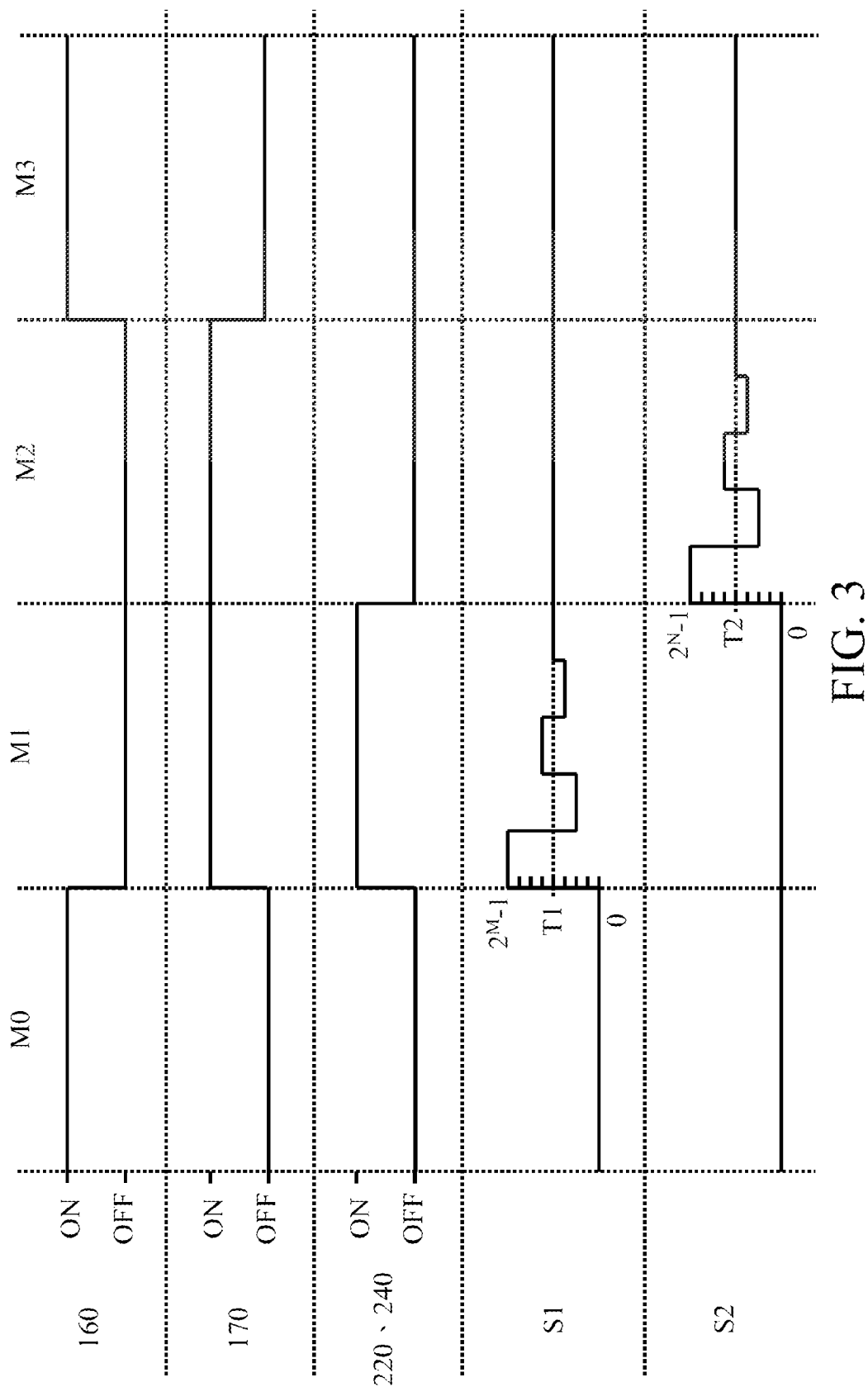
FIG. 3 is a schematic timing diagram of a DC offset calibration system according to some embodiments of the present invention.

FIG. 1 is a schematic block diagram of a DC offset calibration system 10 according to some embodiments of the present invention. FIG. 2 is a schematic circuit diagram of a DC offset calibration system 10 according to some embodiments of the present invention. FIG. 3 is a schematic timing diagram of a DC offset calibration system 10 according to some embodiments of the present invention. Referring to FIG. 1, FIG. 2, and FIG. 3 together, in some embodiments, the DC offset calibration system 10 is disposed at a receiver to process a differential input signal Vin, and is adapted to operate in one of an operation mode M3, a first calibration mode M1, and a second calibration mode M2. The DC offset calibration system 10 includes a matching circuit 100, an equalizing circuit 200, an amplification circuit 300, a control circuit 400, a first digital-to-analog conversion circuit 500, and a second digital-to-analog conversion circuit 600. The equalizing circuit 200 is electrically connected to the matching circuit 100, the amplification circuit 300 is electrically connected to the equalizing circuit 200, the control circuit 400 is electrically connected to the amplification circuit 300, the first digital-to-analog conversion circuit 500 is electrically connected between the control circuit 400 and the amplification circuit 300, and the second digital-to-analog conversion circuit 600 is electrically connected between the control circuit 400 and the equalizing circuit 200. In the operation mode M3, the matching circuit 100 provides impedance matching for the differential input signal Vin.

In some embodiments, in the first calibration mode M1, the control circuit 400 outputs a first digital signal S1, and the first digital-to-analog conversion circuit 500 generates a first differential calibration signal D1 according to the first digital signal S1. The amplification circuit 300 generates a first amplified signal according to the first differential calibration signal D1, and feeds back the first amplified signal to the control circuit 400 to adjust the first digital signal S1, thereby reducing DC offset of the amplification circuit 300.

In some embodiments, in the second calibration mode M2, the control circuit 400 outputs a second digital signal S2, and the second digital-to-analog conversion circuit 600 generates a second differential calibration signal D2 according to the second digital signal S2. The equalizing circuit 200 and the amplification circuit 300 generate a second amplified signal according to the second digital signal S2, and feed back the second amplified signal to the control circuit 400 to adjust the second digital signal S2, thereby reducing DC offset of the equalizing circuit 200.

In some embodiments, specifically, a transceiver (not shown) includes a receiver end and a transmitter end. The receiver end is configured to receive a radio frequency signal, and the transmitter end is configured to receive the radio frequency signal. The receiver end of the transceiver can independently operate in the form of a receiver. The matching circuit 100, the equalizing circuit 200, and the amplification circuit 300 are front-end circuits of the receiver. In some embodiments, the DC offset calibration system 10 is disposed at the receiver, and is configured to generate a corresponding amplified output signal Vout according to the differential input signal Vin, and output the amplified output signal Vout to other circuits of the receiver for processing. It should be noted that the first amplified signal and the second amplified signal are respectively the amplified output signals Vout in different embodiments. Accordingly, the DC offset calibration system 10 responds, by using the control circuit 400, to the amplified output signal Vout fed back by the amplification circuit 300, in the first calibration mode M1, adjusts the first digital signal S1 by using the first digital-to-analog conversion circuit 500, or in the second calibration mode M2, adjusts the second digital signal S2 by using the second digital-to-analog conversion circuit 600, to achieve the function of reducing the DC offset of the front-end circuit of the receiver.

In some embodiments, the DC offset calibration system 10 is further adapted to operate in an uncalibrated operation mode M0. As shown in the timing diagram in FIG. 3, the DC offset calibration system 10 sequentially operates in the uncalibrated operation mode M0, the first calibration mode M1, the second calibration mode M2, and the operation mode M3. Specifically, in the uncalibrated operation mode M0, the control circuit 400 does not output the first digital signal S1 and the second digital signal S2. Accordingly, it may be considered that the control circuit 400 outputs the first digital signal S1 and the second digital signal S2 (for example, a digital signal with a voltage of 0) that are not calibrated.

In some embodiments, in the first calibration mode M1, when the first digital signal S1 is equal to a first target signal T1, the control circuit 400 stops adjusting the first digital signal S1 according to a fact that the first amplified signal is less than a first threshold (not shown), and is switched to operate in the second calibration mode M2. In the second calibration mode M2 or the operation mode M3, the control circuit 400 outputs the first target signal T1, and the first digital-to-analog conversion circuit 500 generates the corresponding first differential calibration signal D1 according to the first target signal T1. Specifically, in some embodiments, when the first amplified signal is less than the first threshold, it indicates that the control circuit 400 has reduced the DC offset of the amplification circuit 300, so that the DC offset of the amplification circuit 300 will not significantly affect the amplified output signal Vout. In other words, in the second calibration mode M2 or the operation mode M3, when the control circuit 400 outputs the first target signal T1, the first amplified signal may be made less than the first threshold, and the DC offset of the amplification circuit 300 may be ignored (for example, the DC offset of the amplification circuit 300 is reduced by about 80%). It should be particularly noted that the control circuit 400 can simultaneously output the first target signal T1 and the second digital signal S2.

In some embodiments, in the second calibration mode M2, when the second digital signal S2 is equal to a second target signal T2, the control circuit 400 stops adjusting the second digital signal S2 according to a fact that the second amplified signal is less than a second threshold (not shown), and is switched to operate in the operation mode M3. In the operation mode M3, the control circuit 400 outputs the second target signal T2, and the second digital-to-analog conversion circuit 600 generates the corresponding second differential calibration signal D2 according to the second target signal T2. Specifically, in some embodiments, when the second amplified signal is less than the second threshold, it indicates that the control circuit 400 has reduced the DC offset of the equalizing circuit 200, so that the DC offset of the equalizing circuit 200 will not significantly affect the amplified output signal Vout. It should be particularly noted that since the DC offset of the amplification circuit 300 has been reduced via the first target signal T1, the second target signal T2 is mainly used to reduce the DC offset of the equalizing circuit 200. In other words, in the second calibration mode M2 or the operation mode M3, when the control circuit 400 outputs the second target signal T2, the second amplified signal may be made less than the second threshold, and the DC offset of the equalizing circuit 200 may be ignored (for example, the DC offset of the equalizing circuit 200 is reduced by about 80%). It should be particularly noted that the control circuit 400 can simultaneously output the first target signal T1 and the second target signal T2. Therefore, in some embodiments, in the second calibration mode M2, the control circuit 400 keeps outputting the first target signal T1. In the operation mode M3, the control circuit 400 keeps outputting the first target signal T1 and the second target signal T2, to reduce the DC offset. In some embodiments, the control circuit 400 adjusts the first digital signal S1 and the second digital signal S2 by using a binary search algorithm.

In some embodiments, the DC offset calibration system 10 is switched from the uncalibrated operation mode M0 to the first calibration mode M1 according to a start signal. The start signal is, for example, but not limited to being received from outside or generated from inside of the DC offset calibration system 10. When the DC offset calibration system 10 is switched from the uncalibrated operation mode M0 to the first calibration mode M1, the control circuit 400 starts to adjust the first digital signal S1 according to the first amplified signal until the first digital signal S1 is adjusted to the first target signal T1. When the DC offset calibration system 10 is switched from the first calibration mode M1 to the second calibration mode M2, the control circuit 400 starts to adjust the second digital signal S2 according to the second amplified signal until the second digital signal S2 is adjusted to the second target signal T2. Therefore, the control circuit 400 keeps outputting the first target signal T1. When the DC offset calibration system 10 is switched from the second calibration mode M2 to the operation mode M3, the control circuit 400 keeps outputting the first target signal T1 and the second target signal T2.

In some embodiments, the matching circuit 100 includes two matching input terminals 110, two matching output terminals 120, a fixed signal input terminal 130, a terminal impedance element 140, a common-mode impedance element 150, a first switch 160, and a second switch 170. The terminal impedance element 140 is electrically connected between two matching input terminals 110, the common-mode impedance element 150 is electrically connected between two matching output terminals 120, the first switch 160 is electrically connected between two matching input terminals 110 and two matching output terminals 120, and the second switch 170 is electrically connected between the fixed signal input terminal 130 and two matching output terminals 120. The two matching input terminals 110 are configured to receive differential input signals Vin, the two matching output terminals 120 are configured to output differential matching output signals V1, and the fixed signal input terminal 130 is configured to receive a first fixed signal Vt1. In some embodiments, the matching circuit 100 further includes two capacitors 180, one of the capacitors 180 is electrically connected between a positive terminal of the matching output terminal 120 and the first switch 160, and the other capacitor 180 is electrically connected between the negative terminal of the matching output terminal 120 and the first switch 160.

In some embodiments, in the first calibration mode M1, the first switch 160 electrically disconnects the two matching input terminals 110 from the two matching output terminals 120, the second switch 170 electrically connects the fixed signal input terminal 130 to the two matching output terminals 120, and the matching circuit 100 generates the differential matching output signal V1 according to the first fixed signal Vt1.

In some embodiments, in the second calibration mode M2, the first switch 160 electrically disconnects the two matching input terminals 110 from the two matching output terminals 120, the second switch 170 electrically connects the fixed signal input terminal 130 to the two matching output terminals 120, and the matching circuit 100 generates the differential matching output signal V1 according to the first fixed signal Vt1. It should be particularly noted that in the first calibration mode M1 or the second calibration mode M2, the first switch 160 is turned off, so that the differential matching output signal V1 is not affected by the differential input signal Vin. In addition, the second switch 170 is turned on, so that the matching circuit 100 can shield other interference signals externally input to the matching circuit 100 according to the first fixed signal Vt1.

In some embodiments, in the operation mode M3, the control circuit 400 outputs a digital operation signal. The first switch 160 electrically connects the two matching input terminals 110 to the two matching output terminals 120, the second switch 170 electrically disconnects the fixed signal input terminal 130 from the two matching output terminals 120, and the matching circuit 100 generates the differential matching output signal V1 according to the differential input signal Vin.

In some embodiments, the terminal impedance element 140 includes a first terminal impedance element, a second terminal impedance element, and a terminal impedance fixed input terminal. The first terminal impedance element and the second terminal impedance element are electrically connected between the two matching input terminals 110 in series, and the terminal impedance fixed input terminal is located at the electrical connection between the first terminal impedance element and the second terminal element, and is configured to receive a second fixed signal Vt2. In some embodiments, the common-mode impedance element 150 includes a first common-mode impedance element, a second common-mode impedance element, and a common-mode impedance fixed input terminal. The first common-mode impedance element and the second common-mode impedance element are electrically connected between the two matching output terminals 120 in series, and the common-mode impedance fixed input terminal is located at the electrical connection between the first common-mode impedance element and the second common-mode impedance element, and is configured to receive a third fixed signal Vt3.

In some embodiments, when the two matching input terminals 110 receive an external fixed signal instead of the differential input signal Vin (for example, an adjustment current source is electrically connected to the two matching input terminals 110 to provide an adjustment current signal), the control circuit 400 can output an adjusted digital signal S0 to adjust the terminal impedance element 140. The terminal impedance element 140 includes a plurality of adjustable termination resistors and a plurality of normally-open termination resistors. The adjustable termination resistors can be adjusted to be turned on or off according to the adjusted digital signal S0 (for example, the adjustable termination resistors are all open or all closed), and the normally-open termination resistors are normally turned on and are not affected by the adjusted digital signal S0. Accordingly, the control circuit 400 outputs the adjusted digital signal S0, the first switch 160 electrically disconnects the two matching input terminals 110 from the two matching output terminals 120 according to the adjusted digital signal S0, and the second switch 170 electrically connects the fixed signal input terminal 130 to the two matching output terminals 120 according to the adjusted digital signal S0. Therefore, the control circuit 400 can respectively obtain a full-off resistance value and a full-on resistance value of the terminal impedance element 140 according to the adjustment current signals received by the two matching input terminals 110 and positive and negative terminal voltages of the terminal impedance element 140. Then, the control circuit 400 obtains an equation between the adjusted digital signal S0 and the resistance value of the terminal impedance element 140 according to the full-off resistance value, the full-on resistance value, the number of adjustable termination resistors, and the number of normally-open termination resistors. The equation is as follows:

$$S0 = (Rh - Rl) * \frac{X * Y}{Rt * (X - Y)} - Y \qquad \text{Equation (1)}$$

"Rl" is the full-on resistance value, "Rh" is the full-off resistance value, "Rt" is the resistance value of the terminal impedance element 140, "X" represents a total number of adjustable termination resistors and normally-open termination resistors, "Y" represents a number of normally-open termination resistors, and "X−Y" represents a number of adjustable termination resistors. Specifically, Equation (1) can be obtained through derivation by using the following formulae:

$$Rh = \frac{Vph + Vnh}{2} * \frac{1}{It} = \frac{Rs}{Y} + Rp \qquad \text{Equation (2)}$$

$$Rl = \frac{Vpl + Vnl}{2} * \frac{1}{It} = \frac{Rs}{X} + Rp \qquad \text{Equation (3)}$$

$$Rs = (Rh - Rl) * \frac{X * Y}{(X - Y)} \qquad \text{Equation (4)}$$

$$Rs = Rt * (S0 + Y) \qquad \text{Equation (5)}$$

When the adjustable termination resistors are all turned off according to the adjusted digital signal S0, "Vph" is a positive terminal voltage value of the terminal impedance element 140, and "Vnh" is a negative terminal voltage value of the terminal impedance element 140. When the adjustable termination resistors are all turned on according to the adjusted digital signal S0, "Vpl" is a positive terminal voltage value of the terminal impedance element 140, and "Vnl" is a negative terminal voltage value of the terminal impedance element 140. "It" is a current value of an adjusted current signal, "Rs" is a resistance value of an adjustable termination resistor or a resistance value of a normally-open termination resistor, and "Rp" is a resistance value of a parasitic resistor. In some embodiments, the parasitic resistance is mainly from a test instrument or a test circuit that measures the positive and negative terminal voltages of the terminal impedance element 140. Specifically, Equation (4) can be obtained by subtracting Equation (3) from Equation (2). Therefore, Equation (1) can be obtained by substituting Equation (4) into Equation (5).

In some embodiments, when the adjusted digital signal S0 output by the control circuit 400 is equal to the matching target signal T0, the matching circuit 100 adjusts, according to the matching target signal T0, a specific number of adjustable termination resistors to be turned on, and the matching circuit 100 provides impedance matching for the differential input signal Vin according to the number of turned-on adjustable termination resistors.

Figure 4:
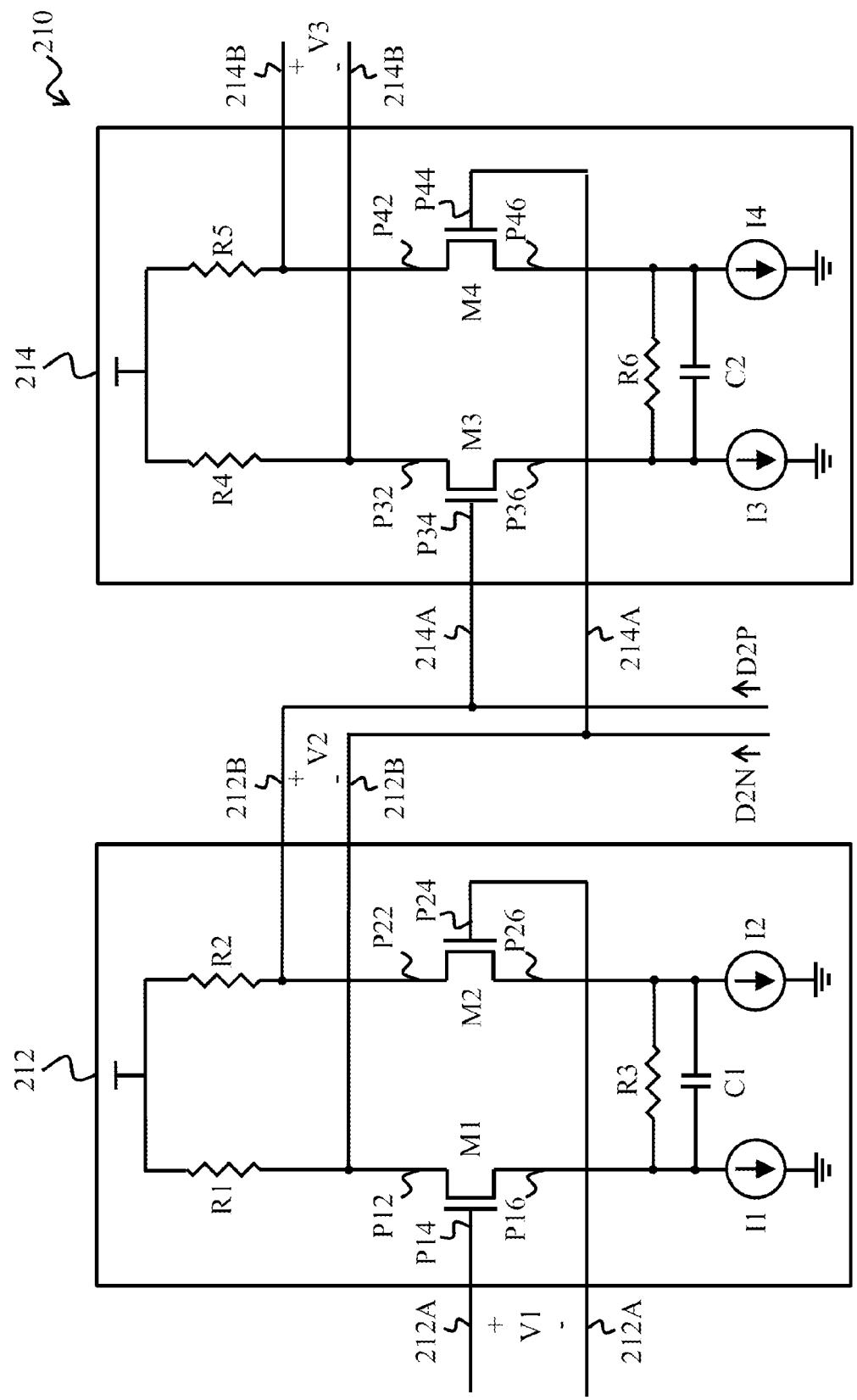
FIG. 4 is a schematic diagram of a first multi-stage amplification circuit according to some embodiments of the present invention.
Figure 5:
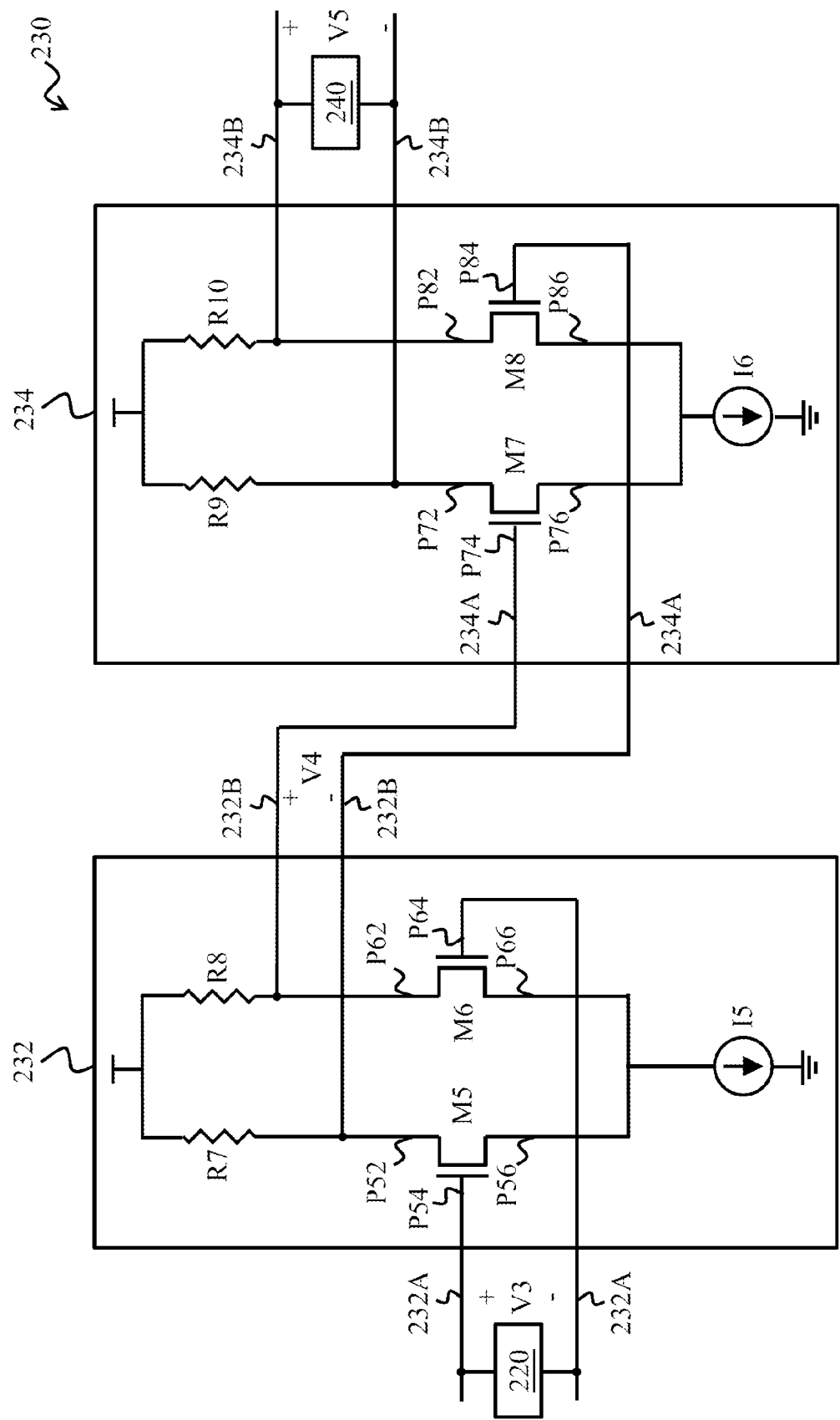
FIG. 5 is a schematic diagram of a second multi-stage amplification circuit according to some embodiments of the present invention.
Figure 6:
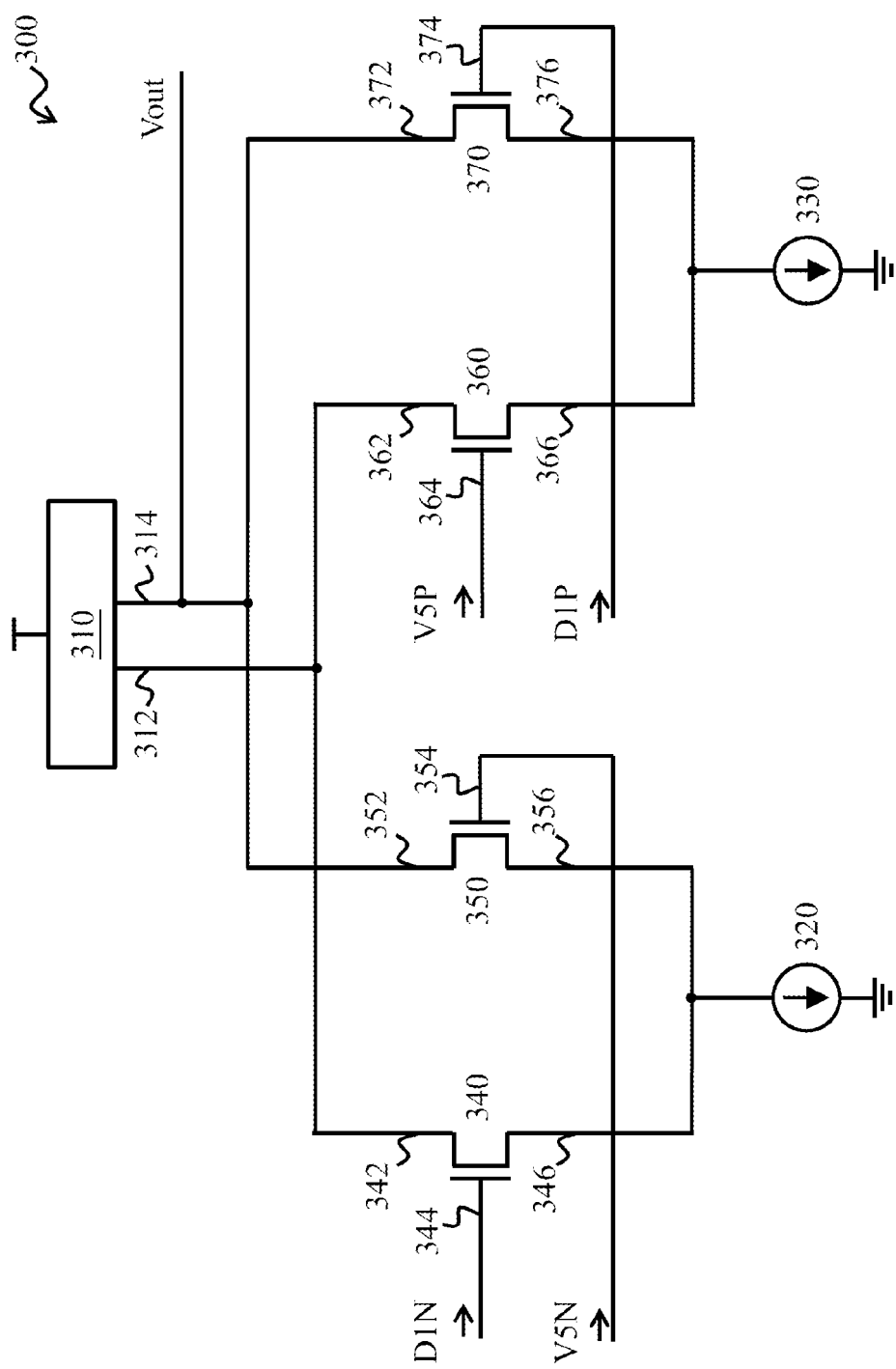
FIG. 6 is a schematic diagram of an amplification circuit according to some embodiments of the present invention.

FIG. 4 is a schematic diagram of a first multi-stage amplification circuit 210 according to some embodiments of the present invention. FIG. 5 is a schematic diagram of a second multi-stage amplification circuit 230 according to some embodiments of the present invention. FIG. 6 is a schematic diagram of an amplification circuit 300 according to some embodiments of the present invention. Referring to FIG. 2, FIG. 4, FIG. 5, and FIG. 6 together, in some embodiments, the equalizing circuit 200 includes the first multi-stage amplification circuit 210, a third switch 220, a second multi-stage amplification circuit 230, and a fourth switch 240. The first multi-stage amplification circuit 210 includes a first primary amplification circuit 212 and a first secondary amplification circuit 214. The first primary amplification circuit 212 includes two first primary amplification input terminals 212A and two first primary amplification output terminals 212B, and the first secondary amplification circuit 214 includes two first secondary amplification input terminals 214A and two first secondary amplification output terminals 214B. The two first primary amplification input terminals 212A of the first primary amplification circuit 212 are electrically connected to two matching output terminals 120 of the matching circuit 100, and the two first primary amplification output terminals 212B of the first primary amplification circuit 212 are electrically connected to the two first secondary amplification input terminals 214A of the first secondary amplification circuit 214 and the second digital-to-analog conversion circuit 600.

In some embodiments, the second multi-stage amplification circuit 230 includes a second primary amplification circuit 232 and a second secondary amplification circuit 234. The second primary amplification circuit 232 includes two second primary amplification input terminals 232A and two second primary amplification output terminals 232B, and the second secondary amplification circuit 234 includes two second secondary amplification input terminals 234A and two second secondary amplification output terminals 234B. The two second primary amplification input terminals 232A of the second primary amplification circuit 232 are electrically connected to the two first secondary amplification output terminals 214B of the first secondary amplification circuit 214, and the two second primary amplification output terminals 232B of the second primary amplification circuit 232 are electrically connected to the two second secondary amplification input terminals 234A of the second secondary amplification circuit 234, and the two second primary amplification output terminals 234A of the second secondary amplification circuit 234 are electrically connected to the amplification circuit 300. The third switch 220 is electrically connected between the two second primary amplification input terminals 232A of the second primary amplification circuit 232, and the fourth switch 240 is electrically connected between the two second primary amplification output terminals 234A of the second secondary amplification circuit 234.

In some embodiments, the first primary amplification circuit 212 generates a first primary differential output signal V2 according to the differential matching output signal V1 of the matching circuit 100, and the first secondary amplification circuit 214 generates a first secondary differential output signal V3 according to a second differential calibration signal D2 (for example, a positive signal D2P and a negative signal D2N of the second differential calibration signal shown in FIG. 4) and the first primary differential output signal V2. The second primary amplification circuit 232 generates a second primary differential output signal V4 according to the first secondary differential output signal V3 of the first secondary amplification circuit 214, and the second secondary amplification circuit 234 generates an equalized differential output signal V5 (that is, a second secondary differential output signal) according to the second primary differential output signal V4. In some embodiments, the first multi-stage amplification circuit 210 is configured to compensate the high frequency band loss of the differential matching output signal V1, and the second multi-stage amplification circuit 230 is configured to enhance strength of the overall frequency band of the first secondary differential output signal V3.

In some embodiments, in the first calibration mode M1, the equalizing circuit 200 turns on the third switch 220 and the fourth switch 240 according to the first digital signal S1. In the second calibration mode M2, the equalizing circuit 200 turns off the third switch 220 and the fourth switch 240 according to the second digital signal S2. In the operation mode M3, the control circuit 400 outputs a digital operation signal. The equalizing circuit 200 turns off the third switch 220 and the fourth switch 240 according to the digital operation signal.

Referring to FIG. 4, in some embodiments, the first primary amplification circuit 212 includes a transistor M1, a transistor M2, a resistor R1, a resistor R2, a resistor R3, a capacitor C1, a current source I1, and a current source I2. The transistor M1 includes an output terminal P12, a control terminal P14, and a current terminal P16. The transistor M2 includes an output terminal P22, a control terminal P24, and a current terminal P26. The control terminal P14 and the control terminal P24 are the two first primary amplification input terminals 212A, and the output terminals P12 and P22 are two the first primary amplification output terminals 212B. The resistor R1 is electrically connected between an operating voltage terminal and the output terminal P12, and the resistor R2 is electrically connected between the operating voltage terminal and the output terminal P22. The resistor R3 is electrically connected between the current terminal P16 and the current terminal P26, the capacitor C1 is electrically connected between the current terminal P16 and the current terminal P26, the current source I1 is electrically connected between the current terminal P16 and a ground terminal, and the current source I2 is electrically connected between the current terminal P26 and the ground terminal. The first secondary amplification circuit 214 includes a transistor M3, a transistor M4, a resistor R4, a resistor R5, a resistor R6, a capacitor C2, a current source I3, and a current source I4. The transistor M3 includes an output terminal P32, a control terminal P34, and a current terminal P36. The transistor M4 includes an output terminal P42, a control terminal P44, and a current terminal P46. The control terminal P34 and the control terminal P44 are the two second primary amplification input terminals 232A, and the output terminal P32 and the output terminal P42 are the two second primary amplification output terminals 232B. The circuit connection mode of the first secondary amplification circuit 214 is similar to that of the first primary amplification circuit 212, and details are not described herein again.

Referring to FIG. 5, in some embodiments, the second primary amplification circuit 232 includes a transistor M5, a transistor M6, a resistor R7, a resistor R8, and a current source I5. The transistor M5 includes an output terminal P52, a control terminal P54, and a current terminal P56. The transistor M6 includes an output terminal P62, a control terminal P64, and a current terminal P66. The control terminal P54 and the control terminal P64 are the two second primary amplification input terminals 232A, and the output terminal P52 and the output terminal P62 are the two second primary amplification output terminals 232B. The resistor R7 is electrically connected between an operating voltage terminal and the output terminal P52, the resistor R8 is electrically connected between the operating voltage terminal and the output terminal P62, and the current source I1 is electrically connected between the current terminal P56 and the current terminal P66. The second secondary amplification circuit 234 includes a transistor M7, a transistor M8, a resistor R9, a resistor R10, and a current source I6. The transistor M7 includes an output terminal P72, a control terminal P74, and a current terminal P76. The transistor M8 includes an output terminal P82, a control terminal P84, and a current terminal P86. The control terminal P74 and the control terminal P84 are the two second secondary amplification input terminals 234A, and the output terminal P72 and the output terminal P82 are the two second secondary amplification output terminals 234B. The circuit connection mode of the second secondary amplification circuit 234 is similar to that of the second primary amplification circuit 232, and details are not described herein again.

Referring to FIG. 2 and FIG. 6 together, in some embodiments, the amplification circuit 300 includes a load circuit 310, a first current source 320, a second current source 330, a first transistor 340, a second transistor 350, a third transistor 360, and a fourth transistor 370. The load circuit 310 includes a first load terminal 312, a second load terminal 314, and an operating voltage terminal. The first transistor 340 includes a first output terminal 342, a first control terminal 344, and a first current terminal 346. The second transistor 350 includes a second output terminal 352, a second control terminal 354, and a second current terminal 356. The third transistor 360 includes a third output terminal 362, a third control terminal 364, and a third current terminal 366. The fourth transistor 370 includes a fourth output terminal 372, a fourth control terminal 374, and a fourth current terminal 376. The first output terminal 342 is electrically connected to the first load terminal 312, the first control terminal 344 is electrically connected to the first digital-to-analog conversion circuit 500, and the first current terminal 346 is electrically connected to the first current source 320. The second output terminal 352 is electrically connected to the second load terminal 314, the second control terminal 354 is electrically connected to one of two second primary amplification input terminals 234A of the equalizing circuit 200, and the second current terminal 356 is electrically connected to the first current source 320. The third output terminal 362 is electrically connected to the first output terminal 342, the third control terminal 354 is electrically connected to the first digital-to-analog conversion circuit 500, and the third current terminal 356 is electrically connected to the second current source 330. The fourth output terminal 372 is electrically connected to the second output terminal 352, the fourth control terminal 374 is electrically connected to the other of two second primary amplification input terminals 234A of the equalizing circuit 200, and the fourth current terminal 376 is electrically connected to the second current source 330. The amplification circuit 300 generates the amplified output signal Vout at the second load terminal 314 by receiving the first differential calibration signal D1 (for example, a positive signal D1P and a negative signal D1N of the first differential calibration signal shown in FIG. 6) at the first control terminal 344 and the fourth control terminal 374 and by receiving the equalized differential output signal V5 (for example, a positive signal V5P and a negative signal V5N of the equalized differential output signal shown in FIG. 6) of the equalizing circuit 200 at the second control terminal 354 and the third control terminal 364.

It should be particularly noted that, in some embodiments, in the first calibration mode M1, the equalizing circuit 200 turns on the third switch 220 and the fourth switch 240. Accordingly, there are short circuits between the two second primary amplification input terminals 232A of the second multi-stage amplification circuit 230 and between the two second primary amplification output terminals 234A of the second secondary amplification circuit 234, so that the equalized differential output signal V5 output by the equalizing circuit 200 is equal to a common-mode voltage signal, that is, the second control terminal 354 and the third control terminal 364 receive the same common-mode voltage signal. Therefore, the common-mode voltage signal can adjust the output amplified output signal Vout according to the first differential calibration signal D1 received by the first control terminal 344 and the fourth control terminal 374.

Figure 7:
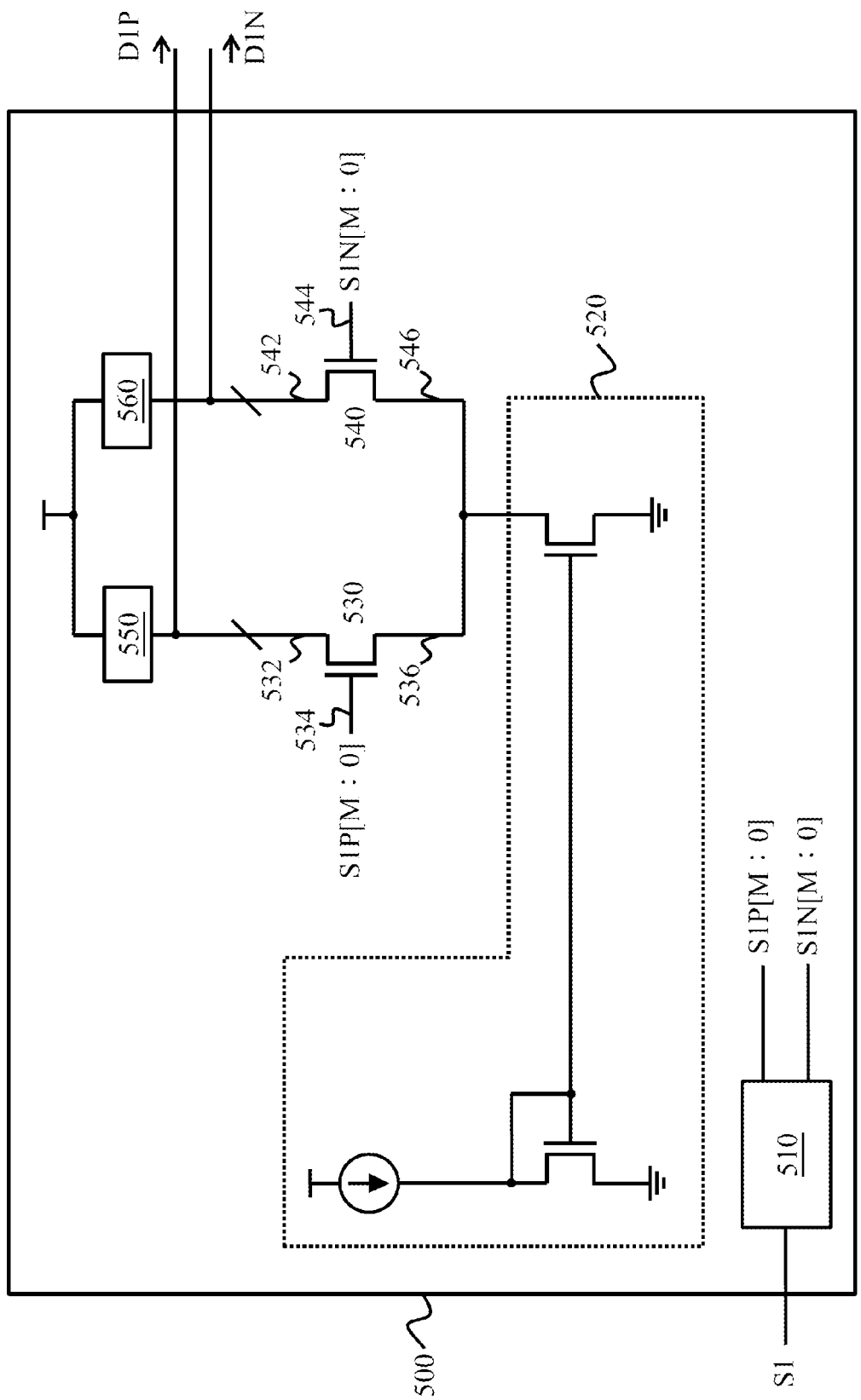
FIG. 7 is a schematic diagram of a first digital-to-analog conversion circuit according to some embodiments of the present invention.

FIG. 7 is a schematic diagram of a first digital-to-analog conversion circuit 500 according to some embodiments of the present invention. Referring to FIG. 7, in some embodiments, the first digital-to-analog conversion circuit 500 includes a first decoding circuit 510, a first current mirror circuit 520, a set of first transistors 530, a set of second transistors 540, a first R-2R ladder network resistance circuit 550, and a second R-2R ladder network resistance circuit 560. The set of first transistors 530 includes a set of first output terminals 532, a set of first control terminals 534, and a set of first current terminals 536, and the set of second transistors 540 includes a set of second output terminals 542, a set of second control terminals 544, and a set of second current terminals 546. The first decoding circuit 510 is electrically connected to the control circuit 400, the first R-2R ladder network resistance circuit 550 is electrically connected between an operating voltage terminal and the set of first output terminals 532, the set of first control terminals 534 is electrically connected to the first decoding circuit 510, the set of first current terminals 536 is electrically connected to the first current mirror circuit 520, the second R-2R ladder network resistance circuit 560 is electrically connected between the operating voltage terminal and the set of second output terminals 542, the set of second control terminals 544 is electrically connected to the first decoding circuit 510, and the set of second current terminals 546 is electrically connected to the first current mirror circuit 520.

Figure 8:
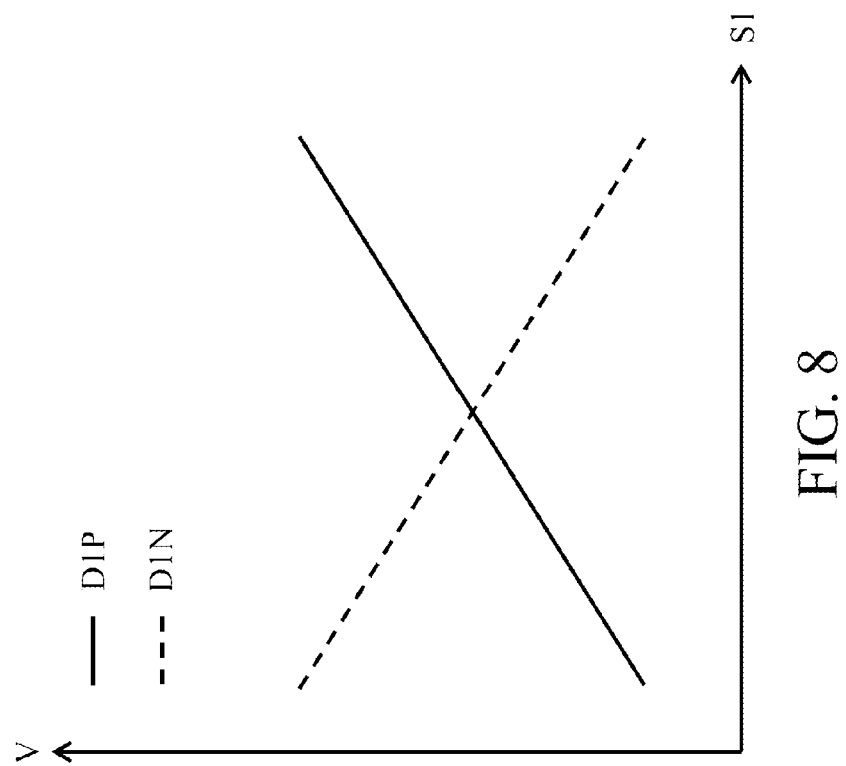
FIG. 8 is a schematic diagram showing a relationship between a first digital signal and a first differential calibration signal according to some embodiments of the present invention.

FIG. 8 is a schematic diagram showing a relationship between a first digital signal S1 and a first differential calibration signal D1 according to some embodiments of the present invention. Referring to FIG. 7 and FIG. 8, in some embodiments, the first decoding circuit 510 generates a set of first positive decoded signals SS1P [M:0] and a set of first negative decoded signals S1N [M:0] according to the first digital signal S1. According to the set of first positive decoded signals S1P [M:0] received by the set of first control terminals 534 and the set of first negative decoded signals S1N [M:0] received by the set of second control terminals 544, the first current mirror circuit 520, the set of first transistors 530, the set of second transistors 540, the first R-2R ladder network resistance circuit 550, and the second R-2R ladder network resistance circuit 560 generate a positive signal D1P of the first differential calibration signal at the set of first output terminals 532, and generate a negative signal DIN of the first differential calibration signal at the set of second output terminals 542. Specifically, the first differential calibration signal D1 includes the positive signal D1P of the first differential calibration signal and the negative signal DIN of the first differential calibration signal. In some embodiments, when the first differential calibration signal D1 is a voltage signal, the relationship between the first digital signal S1 and the positive signal D1P and the negative signal DIN of the first differential calibration signal is shown in FIG. 8.

Figure 9:
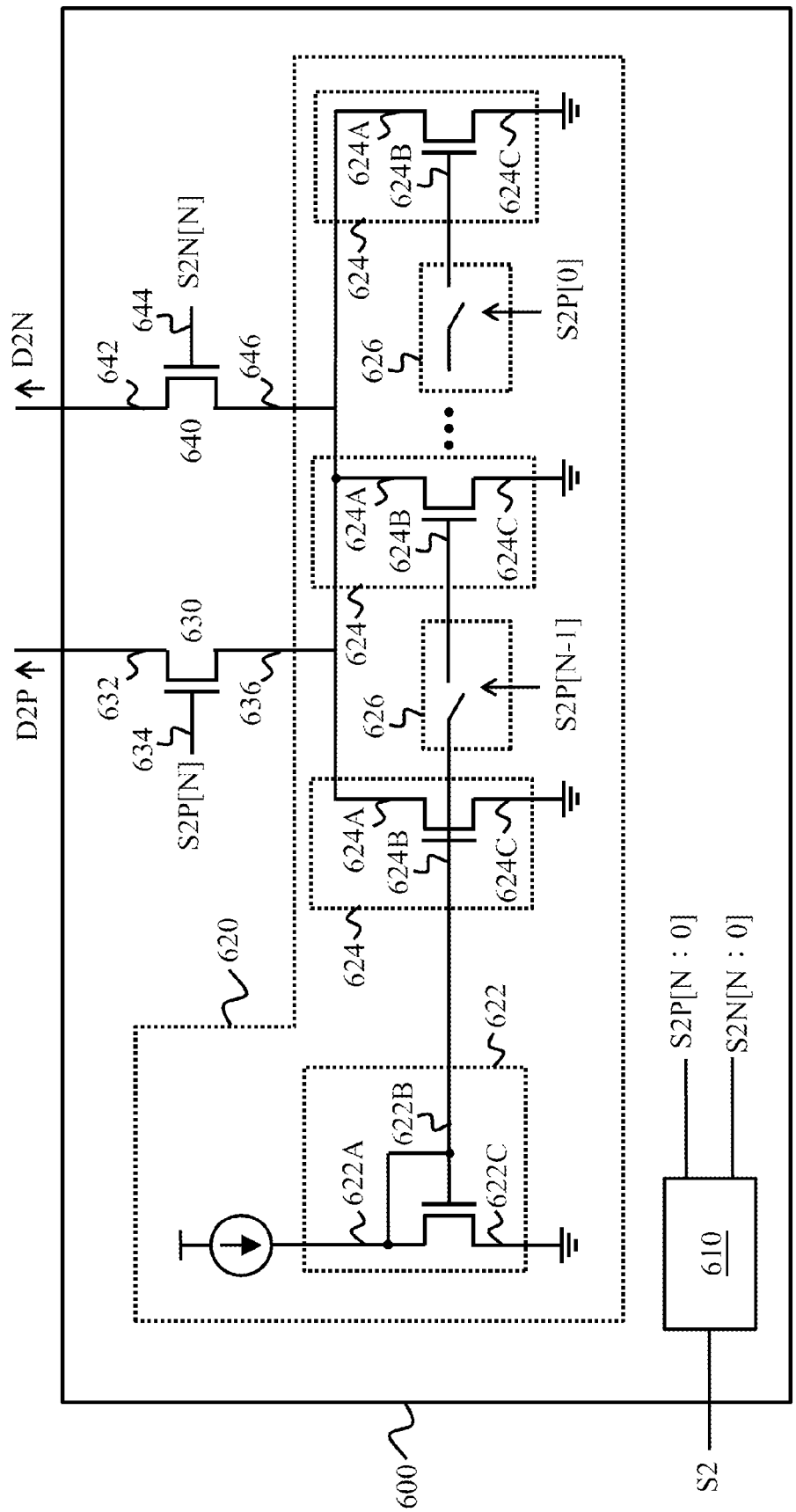
FIG. 9 is a schematic diagram of a second digital-to-analog conversion circuit according to some embodiments of the present invention.

FIG. 9 is a schematic diagram of a second digital-to-analog conversion circuit 600 according to some embodiments of the present invention. Referring to FIG. 9, in some embodiments, the second digital-to-analog conversion circuit 600 includes a second decoding circuit 610, a second current mirror circuit 620, a fifth transistor 630, and a sixth transistor 640. The second current mirror circuit 620 includes a reference transistor 622, a plurality of mirror transistors 624, and a plurality of mirror switch elements 626. The reference transistor 622 includes a reference current terminal 622A, a reference control terminal 622B, and a reference ground terminal 622C. Each of the mirror transistors 624 includes a mirror current terminal 624A, a mirror control terminal 624B, and a mirror ground terminal 624C. The fifth transistor 630 includes a fifth output terminal 632, a fifth control terminal 634, and a fifth current terminal 636, and the sixth transistor 640 includes a sixth output terminal 642, a sixth control terminal 644, and a sixth current terminal 646. The second decoding circuit 610 is electrically connected to a control circuit 400, the reference current terminal 622A is electrically connected to the reference control terminal 622B, and the mirror switch elements 626 are in a one-to-one correspondence with the mirror transistors 624. Each of the mirror switch elements 626 is electrically connected between the reference control terminal 622B of the reference transistor 622 and the mirror control terminal 624B of the corresponding mirror transistor 624, and the mirror current terminal 624A of each of the mirror transistors 624 is electrically connected to the fifth current terminal 636 of the fifth transistor 630 and the sixth current terminal 646 of the sixth transistor 640. The fifth output terminal 632 is electrically connected to the control terminal P34 of the equalizing circuit 200, the fifth control terminal 634 is electrically connected to the second decoding circuit 610, the sixth output terminal 642 is electrically connected to the control terminal P44 of the equalizing circuit 200, and the sixth control terminal 644 is electrically connected to the second decoding circuit 610.

Figure 10:
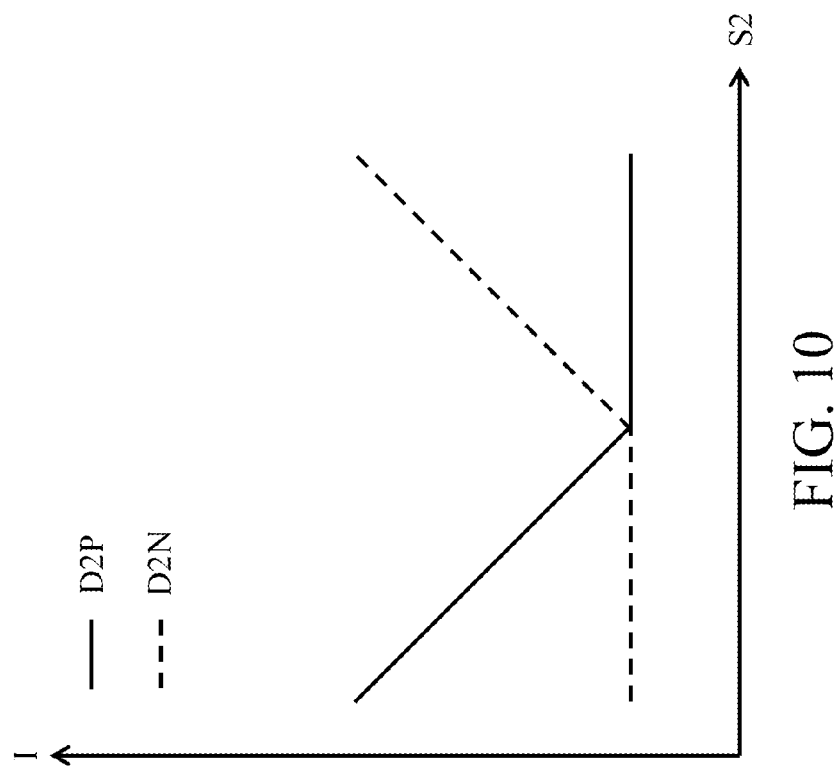
FIG. 10 is a schematic diagram showing a relationship between a second digital signal and a second differential calibration signal according to some embodiments of the present invention.

FIG. 10 is a schematic diagram showing a relationship between a second digital signal S2 and a second differential calibration signal D2 according to some embodiments of the present invention. Referring to FIG. 9 and FIG. 10, in some embodiments, the second decoding circuit 610 generates a set of second positive decoded signals S2P [N:0] and a set of second negative decoded signals S2N [N:0] according to the second digital signal S2. The set of second positive decoded signals S2P [N:0] includes a plurality of sub-signals (for example, S2P [N], S2P [N−1], . . . , S2P [0]). Each of the mirror switch elements 626 is in a one-to-one correspondence with each of the sub-signals in the set of second positive decoded signals S2P [N:0], in other words, each of the mirror switch elements 626 is turned on or off respectively in response to one corresponding sub-signal in the set of second positive decoded signals S2P [N:0], and the second current mirror circuit 620 controls currents supplied to the fifth transistor 630 and the sixth transistor 640 according to the number of mirror switch elements 626 that are turned on. According to one of the sub-signals in the set of second positive decoded signals S2P [N:0] received at the fifth control terminal 634, one of the sub-signals in the set of second negative decoded signals S2N [N:0] received at the sixth control terminal 644, and the current provided by the second current mirror circuit 620, the fifth transistor 630 and the sixth transistor 640 generate a positive signal D2P of the second differential calibration signal at the fifth output terminal 632, and generate a negative signal D2N of the second differential calibration signal at the sixth output terminal 642.

It should be particularly noted that, in some embodiments, the mirror switch element 626 corresponding to the sub-signal S2P [N] can always be set to turn-on, the fifth control terminal 634 receives the sub-signal S2P [N] in the set of second positive decoded signals S2P [N:0], and the sixth control terminal 644 receives the sub-signal S2N [N] in the set of second negative decoded signals S2N [N:0]. In some embodiments, the second differential calibration signal D2 is a current signal. Specifically, the second differential calibration signal D2 includes the positive signal D2P of the second differential calibration signal and the negative signal D2N of the second differential calibration signal. In some embodiments, when the second differential calibration signal D2 is the current signal, the relationship between the second digital signal S2 and the positive signal D2P and the negative signal D2N of the second differential calibration signal is shown in FIG. 10.

Figure 11:
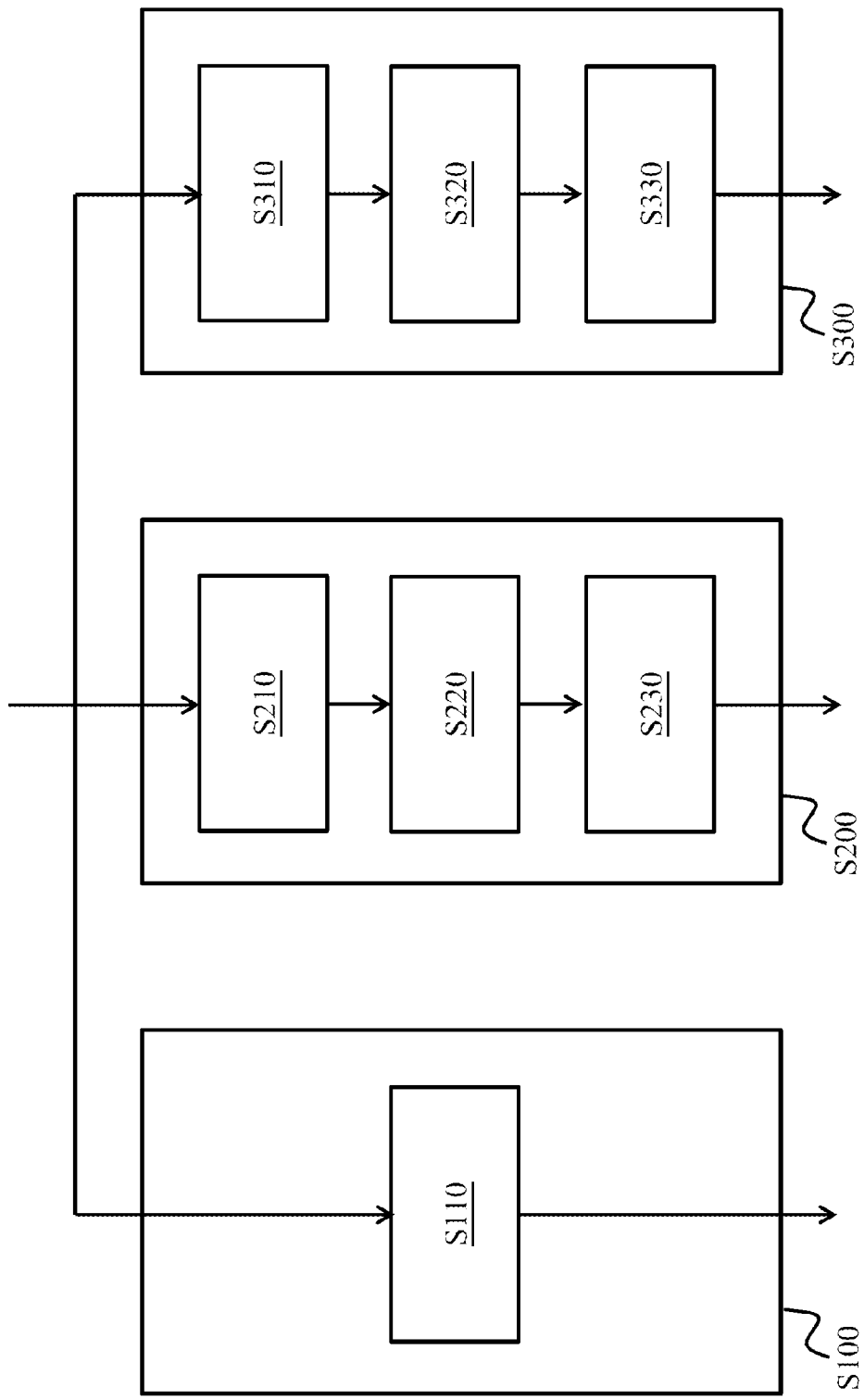
FIG. 11 is a flowchart of a DC offset calibration method according to some embodiments of the present invention.

FIG. 11 is flowchart of a DC offset calibration method according to some embodiments of the present invention. Referring to FIG. 1 and FIG. 11, in some embodiments, the DC offset calibration method is adapted to operate in one of an operation mode, a first calibration mode, and a second calibration mode. The DC offset calibration method includes: an operation mode step (step S100), a first calibration mode step (step S200), and a second calibration mode step (step S300). In the operation mode, the operation mode step (step S100) includes: providing, by a matching circuit 100, impedance matching for a differential input signal Vin (step S110). In the first calibration mode M1, the first calibration mode step (step S200) includes: outputting, by a control circuit 400, a first digital signal S1 (step S210); generating, by a first digital-to-analog conversion circuit 500, a first differential calibration signal D1 according to the first digital signal S1 (step S220); and generating, by an amplification circuit 300, a first amplified signal according to the first differential calibration signal D1, and feeding back the first amplified signal to the control circuit 400 to adjust the first digital signal S1, thereby reducing DC offset of the amplification circuit 300 (step S230). In the second calibration mode M2, the second calibration mode step (step S300) includes: outputting, by the control circuit 400, a second digital signal S2 (step S310); generating, by a second digital-to-analog conversion circuit 600, a second differential calibration signal D2 according to the second digital signal S2 (step S320); and generating, by an equalizing circuit 200 and the amplification circuit 300, a second amplified signal according to the second digital signal S2, feeding back the second amplified signal to the control circuit 400 to adjust the second digital signal S2, thereby reducing DC offset of the equalizing circuit 200 (step S330).

Still referring to FIG. 2, in some embodiments, the DC offset calibration method further includes a matching circuit control method. The matching circuit control method controls the differential matching output signal V1 output by the matching circuit 100, and includes: in the first calibration mode M1: electrically disconnecting the two matching input terminals 110 from the two matching output terminals 120 according to the first digital signal S1; electrically connecting the fixed signal input terminal 130 to the two matching output terminals 120 according to the first digital signal S1; and outputting the differential matching output signal V1 at the two matching output terminals 120 according to the fixed signal (that is, a first fixed signal Vt1); and in the second calibration mode M2: electrically disconnecting the two matching input terminals 110 from the two matching output terminals 120 according to the second digital signal S2; electrically connecting the fixed signal input terminal 130 to the two matching output terminals 120 according to the second digital signal S2; and outputting the differential matching output signal V1 at the two matching output terminals 120 according to the fixed signal (that is, the first fixed signal Vt1).

Based on the above, according to the DC offset calibration system and method provided by some embodiments of the present invention, the control circuit, the first digital-to-analog conversion circuit, and the second digital-to-analog conversion circuit can be used to calibrate the DC offset during processing of the differential input signal by the matching circuit, the equalizing circuit, and the amplification circuit. In the first calibration mode, the control circuit adjusts the output first digital signal according to the amplified signal fed back by the amplification circuit, and the first digital-to-analog conversion circuit outputs the first differential calibration signal to the amplification circuit according to the first digital signal, to adjust the DC offset. In the second calibration mode, the control circuit adjusts the output second digital signal according to the amplified signal fed back by the amplification circuit, and the second digital-to-analog conversion circuit outputs the second differential calibration signal to the equalizing circuit according to the second digital signal, to adjust the DC offset. In the operation mode, the matching circuit can provide impedance matching for the differential input signal. Therefore, the DC offset calibration system can eliminate the DC offset.

What is claimed is:

1. A DC offset calibration system disposed at a receiver to process a differential input signal and adapted to operate in one of an operation mode, a first calibration mode, and a second calibration mode, wherein the DC offset calibration system comprises:
a matching circuit configured to, in the operation mode, provide impedance matching for the differential input signal;
an equalizing circuit electrically connected to the matching circuit;
an amplification circuit electrically connected to the equalizing circuit;
a control circuit electrically connected to the amplification circuit and outputting a first digital signal in the first calibration mode and a second digital signal in the second calibration mode;
a first digital-to-analog conversion circuit configured to generate a first differential calibration signal according to the first digital signal; and
a second digital-to-analog conversion circuit configured to generate a second differential calibration signal according to the second digital signal;
wherein, in the first calibration mode, the amplification circuit generates a first amplified signal according to the first differential calibration signal, and feeds back the first amplified signal to the control circuit to adjust the first digital signal, thereby reducing DC offset of the amplification circuit; and in the second calibration mode, the equalizing circuit and the amplification circuit generate a second amplified signal according to the second digital signal, and feed back the second amplified signal to the control circuit to adjust the second digital signal, thereby reducing DC offset of the equalizing circuit.

2. The DC offset calibration system according to claim 1, wherein the matching circuit comprises:
two matching input terminals configured to receive the differential input signal;
two matching output terminals configured to output a differential matching output signal;
a fixed signal input terminal configured to receive a fixed signal;
a terminal impedance element electrically connected between the two matching input terminals;
a common-mode impedance element electrically connected between the two matching output terminals;
a first switch electrically connected between the two matching input terminals and the two matching output terminals; and
a second switch electrically connected between the fixed signal input terminal and the two matching output terminals;
wherein, in one of the first calibration mode and the second calibration mode, the first switch electrically disconnects the two matching input terminals from the two matching output terminals, the second switch electrically connects the fixed signal input terminal to the two matching output terminals, and the matching circuit generates the differential matching output signal according to the fixed signal.

3. The DC offset calibration system according to claim 2, wherein in the operation mode, the first switch electrically connects the two matching input terminals to the two matching output terminals, the second switch electrically disconnects the fixed signal input terminal from the two matching output terminals, and the matching circuit generates the differential matching output signal according to the differential input signal.

4. The DC offset calibration system according to claim 1, wherein the equalizing circuit comprises:
a first multi-stage amplification circuit comprising: a primary amplification circuit and a secondary amplification circuit, wherein the primary amplification circuit generates a primary differential output signal according to a differential matching output signal of the matching circuit, and the secondary amplification circuit generates a secondary differential output signal according to the second differential calibration signal and the primary differential output signal;
a second multi-stage amplification circuit comprising two amplification input terminals and two amplification output terminals, wherein a differential equalization output signal is output at the two amplification output terminals according to the secondary differential output signal received from the two amplification input terminals;
a third switch electrically connected between the two amplification input terminals; and
a fourth switch electrically connected between the two amplification output terminals;
wherein, in the first calibration mode, the equalizing circuit turns on the third switch and the fourth switch; and in the second calibration mode, the equalizing circuit turns off the third switch and the fourth switch.

5. The DC offset calibration system according to claim 4, wherein in the operation mode, the equalizing circuit turns off the third switch and the fourth switch.

6. The DC offset calibration system according to claim 1, wherein the DC offset calibration system is switched to the second calibration mode after the first calibration mode is completed.

7. The DC offset calibration system according to claim 1, wherein in the first calibration mode, when the first digital signal is equal to a first target signal, the control circuit stops adjusting the first digital signal according to a fact that the first amplified signal is less than a first threshold, and is switched to operate in the second calibration mode; and in the second calibration mode or the operation mode, the control circuit outputs the first target signal, and the first digital-to-analog conversion circuit generates the corresponding first differential calibration signal according to the first target signal.

8. The DC offset calibration system according to claim 1, wherein in the second calibration mode, when the second digital signal is equal to a second target signal, the control circuit stops adjusting the second digital signal according to a fact that the second amplified signal is less than a second threshold, and is switched to operate in the operation mode; and in the operation mode, the control circuit outputs the second target signal, and the second digital-to-analog conversion circuit generates the corresponding second differential calibration signal according to the second target signal.

9. The DC offset calibration system according to claim 1, wherein the first differential calibration signal is a voltage signal, and the second differential calibration signal is a current signal.

10. The DC offset calibration system according to claim 1, wherein in the first calibration mode, an output of the equalizing circuit is a common-mode voltage signal.

11. A DC offset calibration method adapted to operate in one of an operation mode, a first calibration mode, and a second calibration mode, wherein the DC offset calibration method comprises:
in the operation mode:
providing, by a matching circuit, impedance matching for a differential input signal;
in the first calibration mode:
outputting, by a control circuit, a first digital signal;
generating, by a first digital-to-analog conversion circuit, a first differential calibration signal according to the first digital signal; and
generating, by an amplification circuit, a first amplified signal according to the first differential calibration signal, and feeding back the first amplified signal to the control circuit to adjust the first digital signal, thereby reducing DC offset of the amplification circuit; and
in the second calibration mode:
outputting, by the control circuit, a second digital signal;
generating, by a second digital-to-analog conversion circuit, a second differential calibration signal according to the second digital signal; and
generating, by an equalizing circuit and the amplification circuit, a second amplified signal according to the second digital signal, and feeding back the second amplified signal to the control circuit to adjust the second digital signal, thereby reducing DC offset of the equalizing circuit.

12. The DC offset calibration method according to claim 11, further comprising a matching circuit control method for controlling a differential matching output signal output by the matching circuit, wherein the matching circuit comprises two matching input terminals, two matching output terminals, and a fixed signal input terminal, the two matching input terminals are configured to receive the differential input signal, the fixed signal input terminal is configured to receive a fixed signal, and the matching circuit control method comprises:
in the first calibration mode:
electrically disconnecting the two matching input terminals from the two matching output terminals according to the first digital signal;
electrically connecting the fixed signal input terminal to the two matching output terminals according to the first digital signal; and
outputting the differential matching output signal at the two matching output terminals according to the fixed signal; and
in the second calibration mode:
electrically disconnecting the two matching input terminals from the two matching output terminals according to the second digital signal;
electrically connecting the fixed signal input terminal to the two matching output terminals according to the second digital signal; and
outputting the differential matching output signal at the two matching output terminals according to the fixed signal.

13. The DC offset calibration method according to claim 11, wherein:
in the first calibration mode:
when the first digital signal is equal to a first target signal, stopping the control circuit to adjust the first digital signal according to a fact that the first amplified signal is less than a first threshold, and switching to operate in the second calibration mode; and
in the second calibration mode or the operation mode:
outputting, by the control circuit, the first target signal, and
generating, by the first digital-to-analog conversion circuit, the corresponding first differential calibration signal according to the first target signal.

14. The DC offset calibration method according to claim 11, wherein:
in the second calibration mode:
when the second digital signal is equal to a second target signal, stopping the control circuit to adjust the second digital signal according to a fact that the second amplified signal is less than a second threshold, and switching to operate in the operation mode; and
in the operation mode:
outputting, by the control circuit, the second target signal; and
generating, by the second digital-to-analog conversion circuit, the corresponding second differential calibration signal according to the second target signal.

15. The DC offset calibration method according to claim 11, wherein the first differential calibration signal is a voltage signal, and the second differential calibration signal is a current signal.

16. The DC offset calibration method according to claim 11, wherein in the first calibration mode, an output of the equalizing circuit is a common-mode voltage signal.

* * * * *